(12) United States Patent
Fink et al.

(10) Patent No.: US 6,489,384 B2
(45) Date of Patent: Dec. 3, 2002

(54) STABILIZED UV-CROSSLINKABLE HOT-MELT PRESSURE SENSITIVE ADHESIVES

(75) Inventors: Ralf Fink, Limburgerhof (DE); Karl-Heinz Schumacher, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/775,649

(22) Filed: Feb. 5, 2001

(65) Prior Publication Data

US 2001/0024699 A1 Sep. 27, 2001

(30) Foreign Application Priority Data

Feb. 23, 2000 (DE) .......................................... 100 08 295

(51) Int. Cl.⁷ ............................. C08K 5/51; B32B 27/06
(52) U.S. Cl. ....................................... 524/153; 428/480
(58) Field of Search ........................... 524/153; 428/480

(56) References Cited

U.S. PATENT DOCUMENTS

| 5,223,645 A | | 6/1993 | Barwich et al. | |
| 5,248,805 A | | 9/1993 | Boettcher et al. | |
| 6,010,760 A | * | 1/2000 | Miyazaki et al. | ........ 428/36.92 |

FOREIGN PATENT DOCUMENTS

| DE | 2411169 | 3/1974 |
| DE | 38 44 444 A1 | 8/1990 |
| DE | 40 37 079 A1 | 5/1992 |
| EP | 0 246 848 | 11/1987 |

* cited by examiner

Primary Examiner—Kriellion A. Sanders
(74) Attorney, Agent, or Firm—Oblon, Spivak, McClelland, Maier & Neustadt, P.C.

(57) ABSTRACT

A composition comprises a polyacrylate for processing from the melt and a stabilizer having at least one phosphite group.

35 Claims, No Drawings

STABILIZED UV-CROSSLINKABLE HOT-MELT PRESSURE SENSITIVE ADHESIVES

The invention relates to a composition comprising a polyacrylate for processing from the melt and a stabilizer having a phosphite group.

UV-crosslinkable polymers and their use as adhesives, e.g., as hot-melt pressure sensitive adhesives (PSAs), are known, for example, from DE-A-2 411 169, EP-A-246 848, DE-A-4 037 079 or DE-A-3 844 444.

The polymers used for hot-melt adhesives are solid at room temperature and are applied to the desired substrates from the melt at relatively high temperatures.

Required polymers are often supplied already in the fluid state (by tanker truck) and held in said fluid state until subsequent processing.

At the temperatures required, there may be instances of heat-induced crosslinking. It is therefore desired to add effective stabilizers.

The stabilizers must not adversely affect in particular the performance properties in the context of the subsequent use as an adhesive.

A particular problem in this context is represented by UV-crosslinkable polymers which for the subsequent UV-crosslinking include a photoinitiator. The stabilizers may detract from the activity of the photoinitiator and so lead to poor crosslinking and to unfavorable performance properties, e.g., deficient cohesion in the adhesive film.

It is an object of the present invention to overcome the abovementioned problems.

We have found that this object is achieved by the composition defined at the outset, by its use as a hot-melt pressure sensitive adhesive, and by a process for applying said adhesive to appropriate substrates.

The composition of the invention comprises a polyacrylate.

This is an addition polymer obtainable by free-radical polymerization of acrylic monomers, which are understood to include methyl acrylic monomers, with or without further, copolymerizable monomers.

The polyacrylate is composed preferably of at least 40% by weight, with particular preference at least 60% by weight, with very particular preference at least 80% by weight, of $C_1$–$C_{18}$ alkyl (meth)acrylates.

Mention may be made in particular of $C_1$–$C_8$ alkyl (meth)acrylates, e.g., methyl (meth)acrylate, ethyl (meth)acrylate, n-butyl (meth)acrylate, 2-ethylhexyl (meth)acrylate.

The polyacrylate in question is preferably crosslinkable with UV light. For UV crosslinking, a photoinitiator may be added to the composition of the invention. Alternatively, the photoinitiator may be attached to the polyacrylate.

By exposure to high-energy light, especially UV light, the photoinitiator brings about crosslinking of the polymer, preferably by means of a chemical grafting reaction of the photoinitiator with a spatially adjacent polymer chain. Crosslinking may take place in particular by insertion of a carbonyl group from the photoinitiator into an adjacent C—H bond, to form a —C—C—O—H group.

The composition of the invention contains preferably from 0.0001 to 1 mol, with particular preference from 0.0002 to 0.1 mol, with very particular preference from 0.0003 to 0.01 mol, of the photoinitiator, or of the group which acts as a photoinitiator and is attached to the polymer, per 100 g of polyacrylate.

The photoinitiator comprises, for example, acetophenone, benzoin ethers, benzil dialkyl ketals or derivatives thereof.

Preferably, the photoinitiator is attached to the polyacrylate.

With particular preference, the photoinitiator has been incorporated into the polymer chain by means of free-radical copolymerization. For this purpose, the photoinitiator preferably includes an acrylic or methacrylic group.

Suitable copolymerizable photoinitiators are acetophenone derivatives or benzophenone derivatives containing at least one, preferably one, ethylenically unsaturated group. Said ethylenically unsaturated group is preferably an acrylic or methacrylic group.

The ethylenically unsaturated group may be attached directly to the phenyl ring of the acetophenone or benzophenone derivative. In general, there is a spacer group between the phenyl ring and the ethylenically unsaturated group.

The spacer group may contain, for example, up to 100 carbon atoms.

Appropriate acetophenone derivatives or benzophenone derivatives are described, for example, in EP-A-346 734, EP-A-377199 (claim 1), DE-A-4 037 079 (claim 1) and DE-A-3 844 444 (claim 1) and are incorporated into the disclosure content of the present specification by this reference. Preferred acetophenone derivatives and benzophenone derivatives are those of the formula

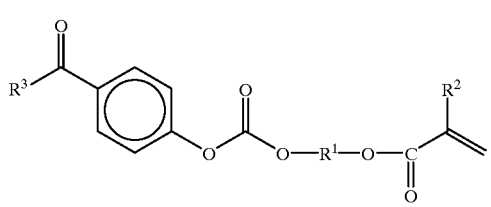

where $R^1$ is an organic radical having up to 30 carbon atoms, $R^2$ is a hydrogen atom or a methyl group, and $R^3$ is a substituted or unsubstituted phenyl group or a $C_1$–$C_4$ alkyl group.

With particular preference, $R^1$ is an alkylene group, especially a $C_2$–$C_8$ alkylene group.

With particular preference, $R^3$ is a methyl group or a phenyl group.

Examples of further monomers of which the polyacrylate may be composed are vinyl esters of carboxylic acids containing up to 20 carbon atoms, vinylaromatic compounds having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and 1 or 2 double bonds, or mixtures of these monomers.

Examples of suitable vinylaromatic compounds are vinyltoluene, α- and p-methylstyrene, α-butylstyrene, 4-n-butylstyrene, 4-n-decylstyrene and, preferably, styrene. Examples of nitriles are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers which may be mentioned include vinyl methyl ether and vinyl isobutyl ether. Preference is given to vinyl ethers of alcohols containing 1 to 4 carbon atoms.

Hydrocarbons having 2 to 8 carbon atoms and two olefinic double bonds which may be mentioned include butadiene, isoprene, and chloroprene.

Further suitable monomers are, in particular, monomers containing carboxylic acid, sulfonic acid or phosphonic acid groups. Carboxylic acid groups are preferred. Mention may be made, for example, of acrylic acid, methacrylic acid, itaconic acid, maleic acid, and fumaric acid.

Further monomers include, for example, hydroxyl-containing monomers, especially $C_1$–$C_{10}$ hydroxyalkyl (meth)acrylates, and (meth)acrylamide.

Mention may be made, furthermore, of phenyloxyethyl glycol mono(meth)acrylate, glycidyl acrylate, glycidyl methacrylate, and amino (meth)acrylates such as 2-aminoethyl (meth)acrylate.

Monomers which in addition to the double bond carry further functional groups, e.g., isocyanate, amino, hydroxy, amide or glycidyl, may improve, for example, the adhesion to substrates.

The polyacrylate preferably has a K value of from 30 to 80, with particular preference from 40 to 60, measured in tetrahydrofuran (1% strength solution, 21° C.).

The K value of Fikentscher is a measure of the molecular weight and viscosity of the polymer.

The glass transition temperature (Tg) of the polymer is preferably from −60 to +10° C., with particular preference from −55 to 0° C., with very particular preference from −55 to −10° C.

The glass transition temperature of the polyacrylate may be determined by customary methods such as differential thermoanalysis or differential scanning calorimetry (see, e.g., ASTM 3418/82, midpoint temperature).

The polyacrylates may be prepared by copolymerizing the monomeric components using the customary polymerization initiators and, if desired, regulators, polymerization being carried out at the customary temperatures in bulk; in emulsion, for example, in water or liquid hydrocarbons; or in solution. The novel copolymers are preferably prepared by polymerizing the monomers in solvents, especially in solvents with a boiling range from 50 to 150° C., preferably from 60 to 120° C., using the customary amount of polymerization initiators, which is generally from 0.01 to 10, in particular from 0.1 to 4,% by weight based on the overall weight of the monomers. Suitable solvents include especially alcohols, such as methanol, ethanol, n- and iso-propanol, n- and iso-butanol, preferably isopropanol and/or isobutanol, and also hydrocarbons such as toluene and, in particular, petroleum spirits with a boiling range of from 60 to 120° C. It is also possible to use ketones, such as acetone, methyl ethyl ketone and methyl isobutyl ketone, and esters, such as ethyl acetate, and also mixtures of solvents of the type specified, preference being given to mixtures containing isopropanol and/or isobutanol in amounts of from 5 to 95, in particular from 10 to 80, preferably from 25 to 60% by weight, based on the solvent mixture used.

In the case of solution polymerization, examples of appropriate polymerization initiators include azo compounds, ketone peroxides, and alkyl peroxides.

Following the polymerization in solution, the solvents may if desired be separated off under reduced pressure, operating at elevated temperatures in the range, for example, from 100 to 150° C. The polymers may then be used in the solvent-free state, i.e., as melts. In many cases it is also of advantage to prepare the novel UV-crosslinkable polymers by polymerization in bulk, i.e., without the use of a solvent, in which case it is possible to operate batchwise or else continuously, in accordance, for example, with the information in U.S. Pat. No. 4,042,768.

The polyacrylates used in the composition of the invention are preferably solvent-free. A residual solvent content, e.g., of organic solvents and/or water, may, however, amount to less than 2 parts by weight, in particular less than 1 part by weight, with particular preference less than 0.5 part by weight, with very particular preference less than 0.2 part by weight, of solvent per 100 parts by weight of polyacrylate.

Besides the polyacrylate, the composition of the invention comprises a stabilizer having at least one phosphite group $P(\text{—O-})_3$.

The stabilizer contains preferably from 1 to 3 phosphite groups, with particular preference 1 phosphite group.

Said stabilizer is generally a low molecular mass compound having a molecular weight of below 1500 g/mol, in particular below 1000 g/mol.

Preferably, it is a compound of the formula

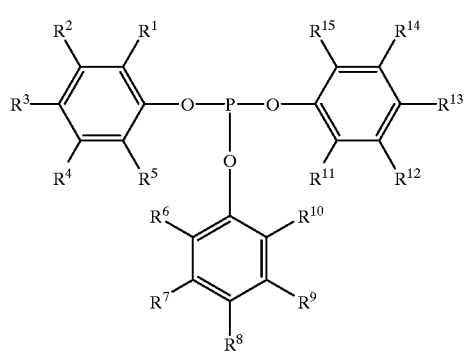

I where $R^1$ to $R^{15}$ independently of one another are each a hydrogen atom or an organic group having up to 20 carbon atoms and having, if desired, heteroatoms such as O, N, Si or S.

On each phenyl ring, preferably at least three, in particular three or four, of the respective radicals R are hydrogen atoms. Preferably one or two, especially one, of the radicals on each phenyl ring is an organic group having up to 20 carbon atoms.

The organic group as radical R may comprise, for example, an alkyl group, an alkene oxide group or an alkylsiloxane group.

Mention may be made of n-alkyl, iso-alkyl and tert-alkyl groups, ethylene oxide, propylene oxide groups, straight-chain and branched alkylsiloxanes, especially dimethylsiloxanes.

Particular preference is given to an alkyl group, e.g., a $C_1$–$C_{20}$ alkyl group.

With particular preference, said stabilizer is a compound of the formula

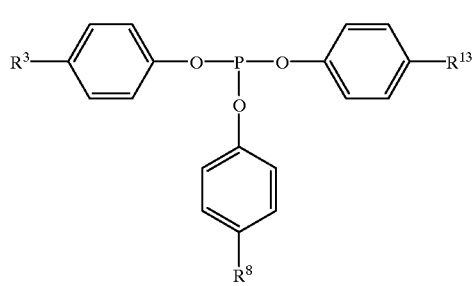

II where $R^3$, $R^8$ and $R^{13}$ are as defined above and with particular preference are a $C_1$–$C_{20}$ alkyl group.

Mention may be made, by way of example, of a stabilizer in which $R^3$, $R^8$ and $R^{13}$ are a $C_9$ alkyl group; a stabilizer of this kind is available as Irgafos® TNPP from Ciba Geigy.

Besides the polyacrylate and the stabilizer, the composition of the invention may also comprise, if desired, further additives, e.g., tackifiers, such as abietic esters, or plasticizers.

The stabilizer content of the composition is preferably from 0.05 to 5 parts by weight, with particular preference from 0.1 to 2 parts by weight, with very particular preference from 0.1 to 1 part by weight, per 100 parts by weight of polyacrylate.

The composition of the invention is suitable for producing coatings; in particular, it is suitable as a hot-melt pressure sensitive adhesive and correspondingly for producing hot-melt pressure sensitive adhesive coatings, e.g., on labels, adhesive tapes, and sheets. The labels may be made, for example, from paper or synthetic materials such as polyesters, polyolefins, or PVC. The adhesive tapes or sheets may likewise be made from the above synthetic materials.

To produce the coatings, the compositions of the invention may be applied preferably in melt form to the target substrates.

For this purpose, the composition is preferably heated at from 60 to 200° C., in particular from 90 to 160° C., so that it is present in melt form.

The melt may if desired be transported or stored at high temperatures, for example, from 60 to 160° C., in particular from 80 to 140° C., for several days, e.g., a week, without any thermal crosslinking being found.

Thereafter, the composition may be applied as a melt, i.e., generally at temperatures from 80 to 160° C., to substrates as mentioned above, for example.

Preferred film thicknesses are, for example, from 2 to 200 μm, with particular preference from 5 to 80 μm, with very particular preference from 10 to 80 μm.

In the case of UV-crosslinkable polyacrylates, the coated substrates may then be exposed to high-energy radiation, preferably UV light, so that crosslinking occurs.

For this purpose, the coated substrates are generally placed on a conveyor belt and the conveyor belt is guided past a radiation source, e.g., a UV lamp.

The degree of crosslinking of the polymers depends on the intensity and duration of exposure.

The radiation energy is preferably in total from 100 to 1500 mJ/cm² of exposed surface area.

The coated substrates obtained may find application preferably as self-adhesive articles, such as labels, adhesive tapes or protective sheets.

The UV-crosslinked hot-melt adhesive coatings obtained have good performance properties, for example, good adhesion and high internal strength. Despite the presence of the stabilizer, the polyacrylates remain readily crosslinkable with UV light.

EXAMPLES

In the following example, acResin® A 258 UV (a UV-crosslinkable polyacrylate) was admixed with 0.3% by weight or, respectively, 0.5% by weight of Irgafos® TNPP (a stabilizer of the above formula II, Ciba-Geigy) and the mixture was conditioned at 160° C. The heat-induced crosslinking process was monitored on the basis of the K value: the reference sample without the addition of Irgafos TNPP had crosslinked after just 48 h. The addition brings about a marked retardation of the thermal crosslinking process.

| Storage time [h] | K value [without Irgafos TNPP] | K value [+0.3% by weight of Irgafos TNPP] | K value [+0.5% by weight of Irgafos TNPP] |
| --- | --- | --- | --- |
| 0 | 51.7 | 51.7 | 51.7 |
| 24 | 52.9 | 52.0 | 51.8 |
| 48 | crosslinked | 53.0 | 52.4 |
| 72 | crosslinked | 54.7 | 54.6 | acResin 258 UV was applied (60 g/m²) to a backing material (Hostaphan RN 36) and then crosslinked by means of UV light of wavelength 260–280 nm (IST-CK emitter, H spectrum, 750 mJ/cm²). The crosslinking achieved was examined on the basis of the shear strength (in accordance with FINAT FTM 8:10 min contact time, 0.5×0.5 inch, 500 g). A corresponding procedure was adopted with a composition additionally containing 0.3% of Irgafos TNPP or, respectively, 0.3% of Irgafos 565 (an aminophenol as stabilizer, commercial product from Ciba Geigy).

| acResin 258 UV | Shear strength [min] |
| --- | --- |
| no addition | 573 |
| with 0.3% by weight of Irgafos TNPP | 430 |
| with 0.3% by weight of Irgafos 565 | 5 |

We claim:
1. A composition comprising a polyacrylate and a stabilizer having at least one phosphite group, wherein said polyacrylate is crosslinkable with UV light.
2. A compositions as claimed in claim 1, wherein said polyacrylate comprises more than 60% by weight of acrylic monomers.
3. A composition as claimed in claim 1, wherein said polyacrylate has a glass transition temperature of from −55 to −10° C.
4. A composition as claimed in claim 1, wherein said polyacrylate has a K value of from 30 to 80, measured in tetrahydrofuran (1% strength solution, 21° C.).
5. A composition as claimed in claim 1, wherein said stabilizer is a compound of the formula:

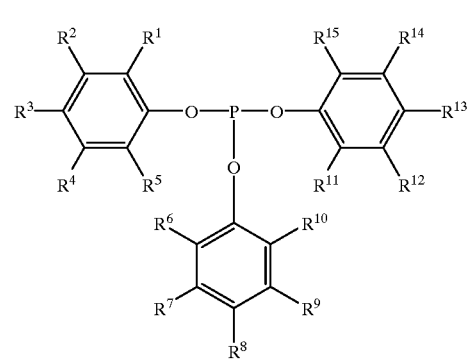

where $R^1$ to $R^{15}$ independently of one another are each a hydrogen atom or an organic group having up to 20 carbon atoms and may optionally contain one or more heteroatomos.
6. A composition as claimed in claim 1, wherein said stabilizer is a compound of the formula

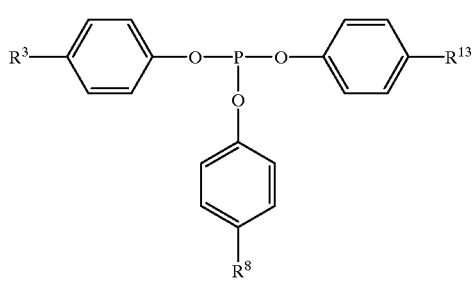

where $R^3$, $R^8$ and $R^{13}$ are as defined above.

7. A composition as claimed in claim 1, wherein the amount of said stabilizer is from 0.1 to 2 parts by weight per 100 parts by weight of polyacrylate.

8. A composition as claimed in claim 1 in the melted state.

9. A process for producing coatings, especially hot-melt pressure sensitive adhesive coatings, wherein a composition as claimed in claim 1
  a) is heated at temperatures from 60 to 200° C. and is present in melt form,
  b) if desired, is transported or stored as a melt at elevated temperatures,
  c) is applied as a melt to substrates, and
  d) in the case of UV-crosslinkable polyacrylates is subsequently exposed to high-energy light.

10. The composition as claimed in claim 5, wherein the heteroatom is O, N, Si or S.

11. A method comprising,
  applying the compositions as claimed in claim 1 in a molten state, to a substrate.

12. The composition of claim 1, wherein the stabilizer has from 1 to 3 phosphite groups.

13. The compositions of claim 1, wherein the stabilizer has a molecular weight of less than 1,500 g/mol.

14. The composition of claim 5, wherein at least three of $R^1$ to $R^{15}$ are hydrogen atoms and at least one of $R^1$ to $R^{15}$ is a organic group having up to 20 carbon atoms.

15. The composition of claim 6, wherein $R^3$, $R^8$ and $R^{13}$ are a $C_9$ alkyl group.

16. The composition of claim 1, wherein the amount of the stabilizer is from 0.01 to 1 parts by weight based on 100 parts by weight of polyacrylate.

17. The composition of claim 5, wherein at least one of $R^1$ to $R^{15}$ is selected from the group consisting of an alkene oxide group and an alkyl siloxane group.

18. A composition comprising a polyacrylate and stabilizer having at least one phosphite group, wherein said polyacrylate has a glass transition temperature of from −55° C. to −10° C.

19. A composition as claimed in claim 18, wherein the polyacrylate comprises more than 60% by weight of acrylic monomers.

20. The composition of claim 18, wherein the polyacrylate is crosslinkable with UV light.

21. The composition of claim 18, wherein the polyacrylate has a K value of from 30 to 80, measured in tetrahydrofuran (1% strength solution, 21° C.).

22. The composition as claimed in claim 18, wherein the stabilizer is a compound of formula I

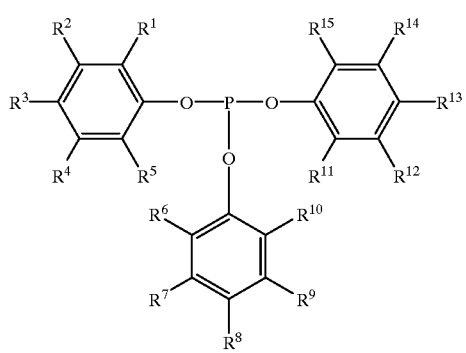

where $R^1$ to $R^{15}$ independently of one another are each a hydrogen atom or an organic group having up to 20 carbon atoms and optionally one or more heteroatoms.

23. The composition as claimed in claim 18, wherein the stabilizer is a compound of formula II

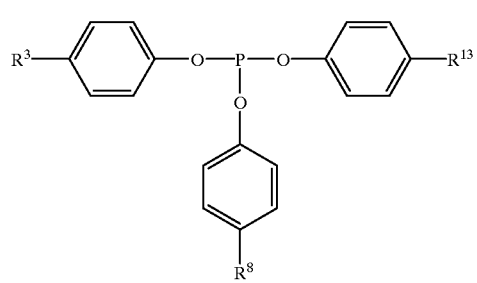

where $R^3$, $R^8$ and $R^{13}$ independently of one another, are each a hydrogen atom or an organic group having up to 20 carbon atoms and may optionally contain one or more heteroatoms.

24. The compositions as claimed in claim 18, wherein the amount of the stabilizer is from 0.1 to 2 parts by weight per 100 parts by weight of polyacrylate.

25. The composition as claimed in claim 18, wherein the composition is in the molten state.

26. The composition as claimed in claim 23, wherein the heteroatom is O, N, S or Si.

27. A process for producing coatings, especially hot-melt pressure sensitive adhesive coatings, wherein a composition as claimed in claim 18
  a) is heated at temperatures from 60 to 200° C. and is present in melt form,
  b) is optionally transported or stored as a melt at elevated temperatures,
  c) is applied as a melt to substrates, and
  d) is subsequently exposed to high-energy light.

28. The composition as claimed in claim 22, wherein the heteroatom is O, N, Si or S.

29. A method comprising,
  applying the composition as claimed in claim 18 in a molten state, to a substrate.

30. The composition of claim 18, wherein the stabilizer has from 1 to 3 phosphite groups.

31. The composition of claim 18, wherein the stabilizer has a molecular weight of less than 1,500 g/mol.

32. The composition of claim 22, wherein at least three of $R^1$ to $R^{15}$ are hydrogen atoms and at least one of $R^1$ to $R^{15}$ is an organic group having up to 20 carbon atoms.

33. The composition of claim 23, wherein $R^3$, $R^8$ and $R^{13}$ are a $C_9$ alkyl group.

34. The composition of claim 18, wherein the amount of the stabilizer is from 0.01 to 1 parts by weight based on 100 parts by weight of polyacrylate.

35. The composition of claim 22, wherein at least one of $R^1$ to $R^{15}$ is selected from the group consisting of an alkyl siloxane group.

* * * * *